US009544976B2

(12) United States Patent
Snyder et al.

(10) Patent No.: US 9,544,976 B2
(45) Date of Patent: Jan. 10, 2017

(54) SYSTEM, METHOD, AND APPARATUS FOR POWERING INTELLIGENT LIGHTING NETWORKS

(71) Applicant: IDS-IP Holdings LLC, San Juan, PR (US)

(72) Inventors: David M. Snyder, Cedar Rapids, IA (US); Leslie D. Baych, Cedar Rapids, IA (US); Walter F. Emig, Cedar Rapids, IA (US)

(73) Assignee: IDS-IP HOLDINGS LLC, San Juan, PR (US)

( * ) Notice: Subject to any disclaimer, the term of this patent is extended or adjusted under 35 U.S.C. 154(b) by 0 days.

(21) Appl. No.: 15/005,886

(22) Filed: Jan. 25, 2016

(65) Prior Publication Data

US 2016/0219679 A1    Jul. 28, 2016

Related U.S. Application Data

(60) Provisional application No. 62/107,092, filed on Jan. 23, 2015, provisional application No. 62/107,104, filed on Jan. 23, 2015, provisional application No. 62/165,510, filed on May 22, 2015, provisional application No. 62/165,485, filed on May 22, 2015, provisional application No. 62/165,478, filed on May 22, 2015, provisional application No. 62/165,468, filed on May 22, 2015, provisional application No. 62/165,462, filed on May 22, 2015, provisional
(Continued)

(51) Int. Cl.
H04L 12/28 (2006.01)
H05B 37/02 (2006.01)
H05B 33/08 (2006.01)

(52) U.S. Cl.
CPC ...... *H05B 37/0254* (2013.01); *H05B 33/0854* (2013.01); *H05B 37/0218* (2013.01); *H05B 37/0263* (2013.01)

(58) Field of Classification Search
CPC .......................... H04L 12/28; H05B 37/0272
USPC ................. 370/254, 338; 315/152, 291, 308
See application file for complete search history.

(56) References Cited

U.S. PATENT DOCUMENTS 9,351,353 B2 * 5/2016 Recker ...................... H02J 9/02
2006/0038506 A1 * 2/2006 Rose .................. H05B 33/0818
315/247
(Continued)

*Primary Examiner* — Thuy Vinh Tran
(74) *Attorney, Agent, or Firm* — McKee, Voorhees & Sease, PLC

(57) ABSTRACT

The present invention relates to a system, method, and apparatus for powering intelligent lighting networks. The power for the intelligent lighting network is supplied by Power-over-Ethernet (PoE) switches and/or Mid-Spans, which are conditioned by a powered device to distribute power tuned specifically for each, at least one light emitting diode (LED) fixture. The Power-over-Ethernet switch and/or Mid-Span with associated router and wireless access point can be used to communicate with, and power a sensor network that collects data relevant to the intelligent lighting network. Optionally, the Power-over-Ethernet switch and/or Mid-Span can be used to communicate with, and power a network of sensors that collects data relevant to the space the intelligent lighting network is operating in, or can be used to communicate with and power a network of AC wall plugs that can be turned on and off, and various switches, relays, and PLCs, RFID systems, USB hubs, etc.

18 Claims, 2 Drawing Sheets

Related U.S. Application Data application No. 62/165,449, filed on May 22, 2015, provisional application No. 62/165,442, filed on May 22, 2015, provisional application No. 62/165,435, filed on May 22, 2015, provisional application No. 62/173,419, filed on Jun. 10, 2015, provisional application No. 62/173,421, filed on Jun. 10, 2015, provisional application No. 62/173,424, filed on Jun. 10, 2015, provisional application No. 62/173,430, filed on Jun. 10, 2015, provisional application No. 62/173,438, filed on Jun. 10, 2015, provisional application No. 62/173,442, filed on Jun. 10, 2015, provisional application No. 62/173,444, filed on Jun. 10, 2015, provisional application No. 62/173,447, filed on Jun. 10, 2015, provisional application No. 62/173,482, filed on Jun. 10, 2015, provisional application No. 62/173,464, filed on Jun. 10, 2015, provisional application No. 62/173,466, filed on Jun. 10, 2015, provisional application No. 62/205,067, filed on Aug. 14, 2015, provisional application No. 62/205,079, filed on Aug. 14, 2015, provisional application No. 62/205,082, filed on Aug. 14, 2015, provisional application No. 62/205,085, filed on Aug. 14, 2015, provisional application No. 62/205,091, filed on Aug. 14, 2015, provisional application No. 62/205,108, filed on Aug. 14, 2015, provisional application No. 62/205,110, filed on Aug. 14, 2015.

(56) References Cited

U.S. PATENT DOCUMENTS

| | | | |
|---|---|---|---|
| 2009/0010178 A1* | 1/2009 | Tekippe | H04W 40/10 370/254 |
| 2013/0250806 A1* | 9/2013 | Essinger | H04W 4/001 370/254 |

* cited by examiner

SYSTEM, METHOD, AND APPARATUS FOR POWERING INTELLIGENT LIGHTING NETWORKS

CROSS-REFERENCE TO RELATED APPLICATIONS

This application claims priority under 35 U.S.C. §119 to Provisional Application U.S. Ser. Nos. 62/107,092 and 62/107,104 both filed on Jan. 23, 2015, all of which are herein incorporated by reference in their entirety.

In addition, this application claims priority under 35 U.S.C. §119 to Provisional Application U.S. Ser. Nos. 62/165,510, 62/165,485, 62/165,478, 62/165,468, 62/165,462, 62/165,449, 62/165,442, and 62/165,435 all filed on May 22, 2015, all of which are herein incorporated by reference in their entirety.

In addition, this application claims priority under 35 U.S.C. §119 to Provisional Application U.S. Ser. Nos. 62/173,419, 62/173,421, 62/173,424, 62/173,430, 62/173,438, 62/173,442, 62/173,444, 62/173,447, 62/173,482, 62/173,464, and 62/173,466 all filed on Jun. 10, 2015, all of which are herein incorporated by reference in their entirety.

In addition, this application claims priority under 35 U.S.C. §119 to Provisional Application U.S. Ser. Nos. 62/205,067, 62/205,079, 62/205,082, 62/205,085, 62/205,091, 62/205,094, 62/205,108, and 62/205,110 all filed Aug. 15, 2015, all of which are herein incorporated by reference in their entirety.

The entire contents of these patent applications are hereby expressly incorporated herein by reference including, without limitation, the specification, claims, and abstract, as well as any figures, tables, or drawings thereof.

FIELD OF THE INVENTION

The present invention relates to a system, method, and apparatus for powering intelligent lighting networks. Power for the intelligent lighting network is supplied by Power-over-Ethernet (PoE) switches and/or Mid-Spans, which are conditioned by a powered device to distribute power tuned specifically for each, at least one light emitting diode (LED) fixture.

BACKGROUND OF THE INVENTION

Traditional LED lighting systems use drivers at each light fixture to convert AC power to suitable DC power. Drivers are typically mounted with the light fixtures, and located in the space above the ceiling. In this type system for LED lighting, the LED lighting fixtures are part of the existing AC electrical circuits. On-Off-Dim controls can be provided by wall switches and dimmers, timers, sensors, or lighting control software programs that are connected to an AC electrical branch circuit; or controllers located within the LED driver that use powerline, low voltage, or wireless communications to be connected to wall switches and dimmers, timers, sensors, or lighting control software programs.

Power-over-Ethernet LED lighting systems use PoE Switch power that is centrally located. The PoE Switch converts AC power to DC power. Intermediate electronics condition the power so it is suitable for use by LED lighting fixtures. The Intermediate electronics also include controllers that use structured cabling and/or wireless for communications.

What is needed is a Power-over-Ethernet LED Lighting system, method, and apparatus for powering intelligent lighting networks that is cost effective and energy efficient. The power for such an intelligent lighting network would be supplied by Power-over-Ethernet switches and/or Mid-Spans, which are conditioned by a powered device to distribute power tuned specifically for each, at least one LED fixture.

OBJECTS AND FEATURES OF THE INVENTION

It is an object of the present invention to provide a system, method, and apparatus for continuously refreshing DC power between on and off states, or on and reduced voltage states, to LED lights.

It is a feature and object of the present invention to use direct current technology to provide functionality.

It is a feature and object of the present invention to use power inverter technology to provide functionality.

It is a feature and object of the present invention to use Time Domain Reflectometry (TDR) technology to provide functionality.

It is a feature and object of the present invention to use pulse width modulation duty cycle technology to provide functionality.

It is a feature and object of the present invention to use switch technology to provide functionality.

It is a feature and object of the present invention to use voltage regulator technology to provide functionality.

It is a feature and object of the present invention to use rectifier technology to provide functionality.

It is a feature and object of the present invention to use computer backplane technology to provide functionality.

It is a feature and object of the present invention to use common power bus technology to provide functionality.

It is a feature and object of the present invention to use Ethernet technology to provide functionality.

It is a feature and object of the present invention to use low voltage wiring technology to provide functionality.

It is a feature and object of the present invention to use twisted pair cable technology to provide functionality.

It is a feature and object of the present invention to use Category 5 cable technology to provide functionality.

It is a feature and object of the present invention to use Category 6 cable technology to provide functionality.

It is a feature and object of the present invention to use Category 7 cable technology to provide functionality.

It is a feature and object of the present invention to use modular connector technology to provide functionality.

It is a feature and object of the present invention to use blade server technology to provide functionality.

It is a feature and object of the present invention to use router technology to provide functionality.

It is a feature and object of the present invention to use Power-over-Ethernet technology to provide functionality.

It is a feature and object of the present invention to use powerline communication technology to provide functionality.

It is a feature and object of the present invention to use phantom power technology to provide functionality.

It is a feature and object of the present invention to use network switch technology to provide functionality.

It is a feature and object of the present invention to use relay technology to provide functionality.

It is a feature and object of the present invention to use ultra-wideband technology to provide functionality.

It is a feature and object of the present invention to use time division for power to provide functionality.

It is a feature and object of the present invention to use refresh rate to provide functionality.

It is a feature and object of the present invention to use flicker to provide functionality.

It is a feature and object of the present invention to use temporal resolution to provide functionality.

It is a feature and object of the present invention to use computer port technology to provide functionality.

It is a feature and object of the present invention to use modular electronics technology to provide functionality.

It is a feature and object of the present invention to use DMX technology to provide functionality.

It is a feature and object of the present invention to use ambient light sensor technology to provide functionality.

It is a feature and object of the present invention to use motion sensor technology to provide functionality.

It is a feature and object of the present invention to use ambient light sensor chronology to provide functionality.

Such an energy efficient system would use a dimmer matrix that is designed to provide the correct amount of electrical power for any specific dimmer setting for an LED fixture, or a daisy chain of LED fixtures. Such an energy efficient system would use two, or more physical channels to provide power to an LED fixture at a lower pulse width modulation (PWM) duty cycle setting, or to power a daisy chain of LED fixtures. Such a cost efficient system would take advantage of using lower PWM duty cycles on two physical channels for each LED fixture, or daisy chain of LED fixtures, to create time bins for N groups of LEDs, or daisy chains of LED fixtures, drawing power from the same Power-over-Ethernet port using a time division multiplexing scheme to reduce Power-over-Ethernet and/or Mid-Span port costs. In addition, a Power-over-Ethernet switch and/or Mid-Span with associated router and wireless access point would be used to communicate with and power, a sensor network that collects data relevant to the intelligent lighting network. Optionally, the Power-over-Ethernet switch and/or Mid-Span with associated router and wireless access point would be used to communicate with and power, a network of sensors that collects data relevant to the space the intelligent lighting network is operating in. Optionally, the Power-over-Ethernet switch and/or Mid-Span with associated router and wireless access point would be used to communicate with and power, a network of AC wall plugs that can be turned on and off, and various switches, relays, and PLCs, RFID systems, USB hubs, etc.

SUMMARY OF THE INVENTION

Figure 1:
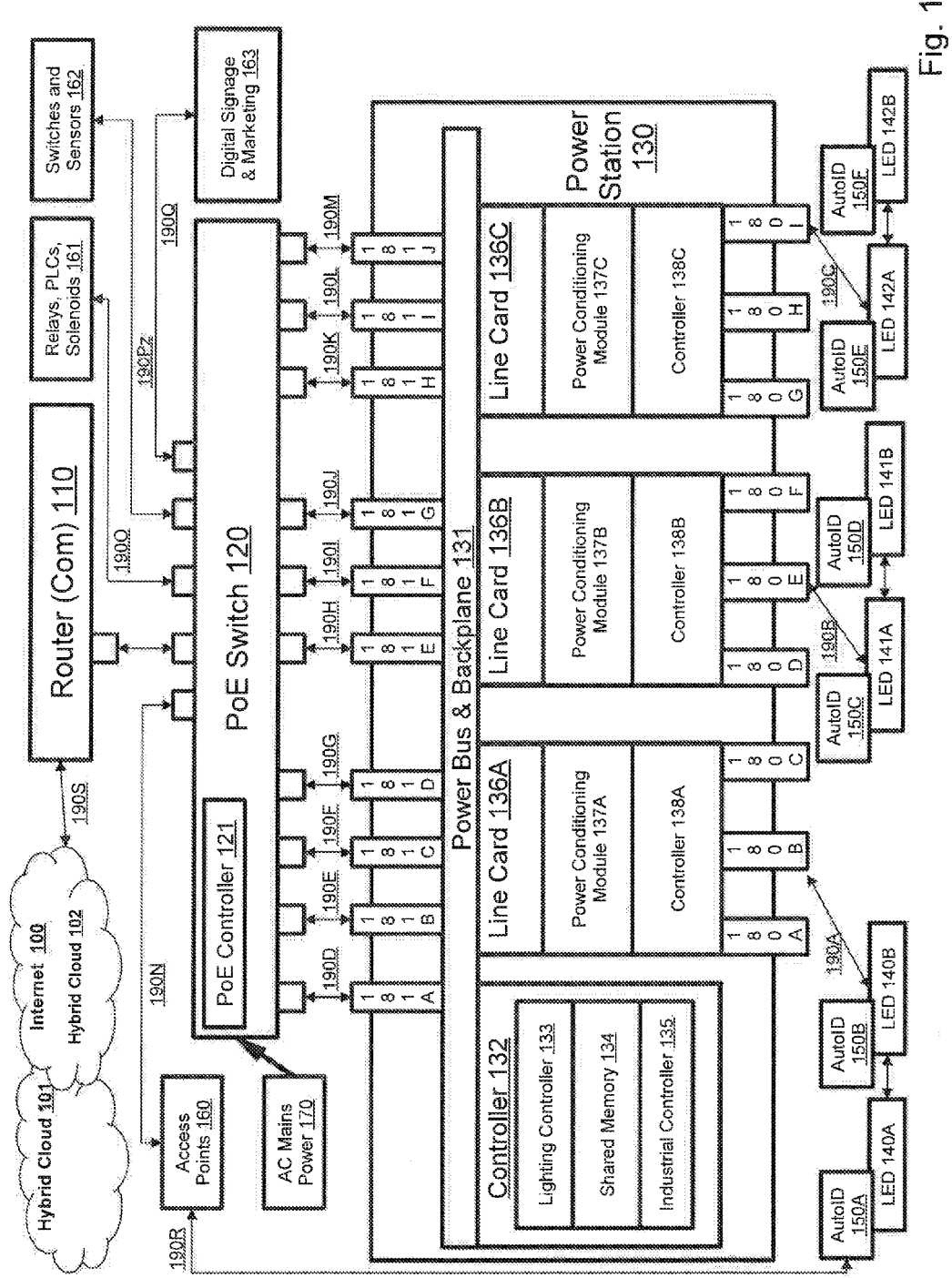
FIG. 1 is an illustration of the present invention shown in context of its larger eco-system.

The present invention relates to a system, method, and apparatus for powering intelligent lighting networks, and includes an integrated data collection and marketing system. The power for the intelligent lighting network is supplied by Power-over-Ethernet switches, which is conditioned to properly power LED fixtures. In addition, the Power-over-Ethernet switch, associated router, and wireless access point, can be used to power a sensor network that collects data that is relevant to a client and their customers. Furthermore, the data collected from the sensor network can be used to drive a marketing system that also is connected to the Power-over-Ethernet switch, associated router, and wireless access point.

LEDs are following Moore's Law, and growing in efficacy at a good rate. The following is a chart for a 2'×2' LED fixture that is engineered with 100 lumens per watt (LPW) diodes. Chart 1 records pulse width modulation (PWM) settings vs. measured foot-candles per Watt (fc/Watt). The results illustrate the non-linear response of LEDs light output vs input energy, and the energy saved at various dimmer settings vs a traditional linear power setting for a 0-10V dimmer. The Non-Linear Dimmer Matrix Setting for 100% light is selected to be 900 fc, which allows a 5.56% overhead as the LED fixture begins to degrade over time.

CHART 1

Single Physical Channel for Powering a LED Fixture

| PWM Duty Cycle | fc | Watts | fc/Watt | % Light Using 900 fc As The Top End Design Setting | Corresponding Non-Linear Dimmer Matrix Setting | Energy Saved Vs. Traditional Linear Power Setting |
|---|---|---|---|---|---|---|
| 100 | 950 | 30.13 | 31.53 | 105.56% | | |
| 99 | 950 | 29.85 | 31.83 | 105.56% | | |
| 98 | 900 | 29.66 | 30.34 | 100.00% | | |
| 97 | 900 | 29.66 | 30.34 | 100.00% | | |
| 96 | 900 | 29.42 | 30.60 | 100.00% | | |
| 95 | 900 | 29.25 | 30.77 | 100.00% | | |
| 94 | 900 | 29.10 | 30.93 | 100.00% | | |
| 93 | 900 | 29.07 | 30.96 | 100.00% | | |
| 92 | 900 | 28.88 | 31.16 | 100.00% | | |
| 91 | 900 | 28.69 | 31.37 | 100.00% | | |
| 90 | 900 | 28.53 | 31.55 | 100.00% | | |
| 89 | 900 | 28.37 | 31.72 | 100.00% | | |
| 88 | 900 | 28.20 | 31.92 | 100.00% | | |
| 87 | 900 | 28.02 | 32.12 | 100.00% | | |
| 86 | 900 | 27.82 | 32.35 | 100.00% | | |
| 85 | 900 | 27.69 | 32.50 | 100.00% | | |
| 84 | 900 | 27.49 | 32.74 | 100.00% | | |
| 83 | 900 | 27.29 | 32.98 | 100.00% | | |
| 82 | 900 | 27.07 | 33.25 | 100.00% | | |
| 81 | 900 | 26.90 | 33.46 | 100.00% | | |
| 80 | 900 | 26.63 | 33.80 | 100.00% | | |

CHART 1-continued

Single Physical Channel for Powering a LED Fixture

| PWM Duty Cycle | fc | Watts | fc/Watt | % Light Using 900 fc As The Top End Design Setting | Corresponding Non-Linear Dimmer Matrix Setting | Energy Saved Vs. Traditional Linear Power Setting |
|---|---|---|---|---|---|---|
| 79 | 900 | 26.41 | 34.08 | 100.00% | | |
| 78 | 900 | 26.14 | 34.43 | 100.00% | | |
| 77 | 900 | 25.90 | 34.75 | 100.00% | 100% | 14.04% |
| 76 | 830 | 25.60 | 32.42 | 92.22% | | |
| 75 | 830 | 25.33 | 32.77 | 92.22% | | |
| 74 | 830 | 25.04 | 33.15 | 92.22% | | |
| 73 | 830 | 24.71 | 33.59 | 92.22% | | |
| 72 | 830 | 24.37 | 34.05 | 92.22% | | |
| 71 | 830 | 24.05 | 34.51 | 92.22% | | |
| 70 | 830 | 23.67 | 35.06 | 92.22% | | |
| 69 | 830 | 23.30 | 35.62 | 92.22% | | |
| 68 | 830 | 22.92 | 36.21 | 92.22% | | |
| 67 | 830 | 22.50 | 36.90 | 92.22% | | |
| 66 | 830 | 22.06 | 37.62 | 92.22% | | |
| 65 | 830 | 21.64 | 38.35 | 92.22% | | |
| 64 | 830 | 21.22 | 39.11 | 92.22% | | |
| 63 | 830 | 20.81 | 39.89 | 92.22% | | |
| 62 | 830 | 20.34 | 40.81 | 92.22% | | |
| 61 | 830 | 19.83 | 41.85 | 92.22% | | |
| 60 | 830 | 19.18 | 43.27 | 92.22% | | |
| 59 | 830 | 18.42 | 45.05 | 92.22% | | |
| 58 | 800 | 17.88 | 44.74 | 92.22% | | |
| 57 | 800 | 17.25 | 46.39 | 88.89% | | |
| 56 | 800 | 16.74 | 47.79 | 88.89% | | |
| 55 | 800 | 16.09 | 49.73 | 88.89% | 90% | 40.68% |
| 54 | 700 | 15.52 | 45.09 | 77.78% | | |
| 53 | 700 | 14.97 | 46.77 | 77.78% | | |
| 52 | 700 | 14.44 | 48.49 | 77.78% | 80% | 40.11% |
| 51 | 670 | 13.97 | 47.96 | 74.44% | | |
| 50 | 670 | 13.49 | 49.67 | 74.44% | | |
| 49 | 670 | 12.98 | 51.63 | 74.44% | | |
| 48 | 640 | 12.49 | 51.24 | 71.11% | | |
| 47 | 640 | 11.99 | 53.36 | 71.11% | | |
| 46 | 640 | 11.56 | 55.37 | 71.11% | 70% | 45.20% |
| 45 | 600 | 11.08 | 54.14 | 66.66% | | |
| 44 | 600 | 10.65 | 56.34 | 66.66% | | |
| 43 | 600 | 10.21 | 58.78 | 66.66% | | |
| 42 | 600 | 9.77 | 61.41 | 66.66% | | |
| 41 | 550 | 9.34 | 58.86 | 61.11% | | |
| 40 | 550 | 8.88 | 61.91 | 61.11% | | |
| 39 | 550 | 8.50 | 64.67 | 61.11% | 60% | 48.31% |
| 38 | 500 | 8.15 | 61.32 | 55.55% | | |
| 37 | 500 | 7.75 | 64.53 | 55.55% | | |
| 36 | 480 | 7.37 | 65.13 | 53.33% | | |
| 35 | 480 | 7.14 | 67.26 | 53.33% | | |
| 34 | 440 | 6.81 | 64.61 | 48.89% | | |
| 33 | 440 | 6.42 | 68.58 | 48.89% | | |
| 32 | 440 | 6.12 | 71.90 | 48.89% | 50% | 54.80% |
| 31 | 410 | 5.85 | 70.08 | 45.55% | | |
| 30 | 410 | 5.48 | 74.87 | 45.55% | | |
| 29 | 400 | 5.18 | 77.20 | 44.44% | | |
| 28 | 400 | 4.93 | 81.20 | 44.44% | | |
| 27 | 360 | 4.70 | 76.61 | 40.00% | | |
| 26 | 360 | 4.46 | 80.66 | 40.00% | 40% | 62.97% |
| 25 | 340 | 4.13 | 82.36 | 37.78% | | |
| 24 | 340 | 3.89 | 87.44 | 37.78% | | |
| 23 | 320 | 3.69 | 86.61 | 35.55% | | |
| 22 | 300 | 3.51 | 85.51 | 33.33% | | |
| 21 | 300 | 3.25 | 92.26 | 33.33% | | |
| 20 | 270 | 3.06 | 88.35 | 30.00% | 30% | 66.19% |
| 19 | 240 | 2.99 | 80.36 | 26.67% | | |
| 18 | 240 | 2.78 | 86.36 | 26.67% | | |
| 17 | 220 | 2.59 | 85.05 | 24.44% | | |
| 16 | 200 | 2.33 | 85.75 | 22.22% | | |
| 15 | 200 | 2.15 | 92.99 | 22.22% | | |
| 14 | 190 | 1.98 | 95.78 | 21.11% | | |
| 13 | 180 | 1.72 | 104.48 | 20.00% | 20% | 71.41% |
| 12 | 170 | 1.57 | 108.27 | 18.89% | | |
| 11 | 150 | 1.36 | 109.99 | 16.67% | | |
| 10 | 130 | 1.20 | 108.46 | 14.44% | | |
| 9 | 120 | 1.09 | 110.00 | 13.33% | | |
| 8 | 100 | 0.86 | 115.83 | 11.11% | | |

CHART 1-continued

Single Physical Channel for Powering a LED Fixture

| PWM Duty Cycle | fc | Watts | fc/Watt | % Light Using 900 fc As The Top End Design Setting | Corresponding Non-Linear Dimmer Matrix Setting | Energy Saved Vs. Traditional Linear Power Setting |
|---|---|---|---|---|---|---|
| 7 | 90 | 0.73 | 123.88 | 10.00% | 10% | 75.89% |
| 6 | 73 | 0.64 | 113.99 | 8.11% | | |
| 5 | 64 | 0.51 | 125.66 | 7.11% | | |
| 4 | 50 | 0.44 | 112.54 | 5.56% | | |
| 3 | 37 | 0.35 | 105.14 | 4.11% | | |
| 2 | 25 | 0.26 | 96.41 | 2.78% | | |
| 1 | 12 | 0.11 | 106.67 | 1.33% | | |

Chart 1 illustrates the primary features of the present invention:

At a PWM duty cycle of 77%, the output of the LED fixture is 900 fc, which saves 14.04% energy vs. running the LED fixture at a PWM duty cycle of 100%.

At a PWM duty cycle of 52%, the output of the LED fixture is 700 fc (or a non-linear dimmer matrix setting of 80%), which saves 40.11% energy vs. running the LED fixture at a PWM duty cycle of 100%.

At a PWM duty cycle of 46%, the output of the LED fixture is 640 fc (or a non-linear dimmer matrix setting of 70%), which saves 45.20% energy vs. running the LED fixture at a PWM duty cycle of 100%.

At a PWM duty cycle of 32%, the output of the LED fixture is 440 fc (or a non-linear dimmer matrix setting of 50%), which saves 54.80% energy vs. running the LED fixture at a PWM duty cycle of 100%.

Therefore as an example, using two stacked physical channels, both operating at a PWM duty cycle of 0.333, the present invention can make approximately 100% of the maximum light (900 fc) while saving approximately six (6) to eight (8) watts vs. running the same LED fixture at a PWM duty cycle of 100%, which is a primary benefit of the present invention.

As a result a non-linear dimmer matrix can be constructed to manage light output luminosity vs. power input so that each LED fixture, or daisy chained group of LED fixtures, is using the minimum amount of electricity to produce the required light at any dimmer setting.

A second benefit of operating using two stacked physical channels is a time division multiplexing scheme can be constructed that allows multiple LED fixtures, or multiple daisy chains of LED fixtures, to be powered by a single PoE port. As an example, using Chart 1 we can operate three (3) LED fixtures using a time division multiplexing scheme, in which each LED fixture is operating using two stacked physical channels, operating with a 33% duty cycle, and then staggering the start time of each LED fixture so that only one (1) LED fixture is drawing power at any point in time. In this example, three (3) LED fixtures, or daisy chains of LED fixtures, can operate on a single Power-over-Ethernet or Mid-Span port using a series of staggered start times, which greatly reduces Power-over-Ethernet Switch and/or Mid-Span equipment costs.

The primary features of the present invention are: 1) stacking at least two physical channels to drive each LED fixture, or daisy chain of LED fixtures, 2) managing dimmer settings using linear luminosity requirements vs. uncorrelated linear power settings, and 3) managing the start time for each LED fixture, or daisy chain of LED fixtures, and the present invention also uses 4) sensors to detect ambient light conditions related to a particular LED fixture, or zone of LED fixtures, identified by room or space definitions that are cross-referenced to OSHA requirements, National and Local building code requirements, standards organizations, and/or customer requirements to either minimum or desired ambient light conditions. As an example, the requirements for a building corridor are much different than for a hospital room, office space or lobby. The present invention's dimmer controls can be set to operate according to static dimmer settings in the lighting program that are adjusted according to signals received from at least one strategically place ambient light sensor, or by automatically adjusted dimmer settings according to signals received from at least one strategically placed ambient light sensor which are cross-referenced to tables for spaces and rooms defined in OSHA regulations, and/or National and Local building codes, standards organizations, or proprietary requirements. The fifth (5th) primary feature of the present invention is intelligent lighting systems can be self-configuring using AutoID technologies, such as, but not limited to, RFID tags, barcoded tags, etc., to simplify the installation, commissioning, and warranty processes for simple, or very complicated, lighting environments.

These features of the present invention will be described in more detail in the detailed description of the various embodiments of the present invention.

DETAILED DESCRIPTION OF VARIOUS EMBODIMENTS

The present invention relates to a system, method, and apparatus for powering intelligent lighting networks, and includes an integrated data collection and marketing system. Power for the intelligent lighting network is supplied by Power-over-Ethernet switches, which is conditioned to properly power LED fixtures.

In addition, the Power-over-Ethernet switch, associated router, and wireless access point, can be used to power a sensor network that collects data that is relevant to a client and their customers.

Furthermore, the data collected from the sensor network can be used to drive a marketing system that also is connected to the Power-over-Ethernet switch, associated router, and wireless access point.

Even furthermore, the present invention includes a power distribution unit, referred to throughout the description of the present invention as Power Station 130, which includes an integrated Lighting System Controller and optional integrated Industrial System Controller, a structured cabling network, sensors, wall switches, and LED fixtures.

FIG. 1 is an illustration of one embodiment of the present invention in which the Power Station 130 includes Controller 132, Lighting Controller 133, Shared Memory 134, Optional Industrial Controller 135, and Line Cards 136A, B,C integrated in a rack-mountable chassis, which includes the elements, objects, features, and benefits described as follows.

Internet 100 is a global system of interconnected computer networks that use the Internet protocol suite (TCP/IP) to link several billion devices worldwide. It is a network of networks that consists of millions of private, public, academic, business, and government networks of local to global scope, linked by a broad array of electronic, wireless, and optical networking technologies. The Internet carries an extensive range of information resources and services, such as the inter-linked hypertext documents and applications of the World Wide Web (WWW), the infrastructure to support email, telephony, and peer-to-peer networks for file sharing. Internet 100 also illustrates the deployment of Hybrid Cloud 102. Hybrid Clouds are further described in element 101 following. The Hybrid Cloud 102 that operates on Internet 100 includes applications, software, and databases for an enterprise resource planning (ERP) system, and an ISO/OSHA graphical user interface (GUI) that is a series of interconnected processes that overlay the present invention's ERP system. In addition, Hybrid Cloud 102 includes applications, software, and databases for Lighting as a Service (LaaS) system, Marketing as a Service (MaaS) system, VoIP as a Service (VoIPaaS) system, and Location as a Service (XYZaaS) system. Hybrid Cloud 102 is built using Cisco Integration Platform (CIP) and Cisco Intercloud products. Both of these products are further described in Hybrid Cloud 101.

Hybrid Cloud 101 is a composite cloud service that crosses the boundaries of private, public, and community clouds that extends the capacity and capability, via aggregation and integration, of the composite cloud service provided by the present invention. As an example, the present invention may store sensitive client data in house on a private cloud application and interconnect that application to a business intelligence application provided on a public cloud, as a software service. In the present invention, Hybrid Cloud 101 and Hybrid Cloud 102 communicate over Internet 100. The data is collected and stored as a result of using the present invention's sensors that are part of LaaS (Lighting as a Service) and MaaS (Marketing as a Service) systems. These sensors include WiFi and Bluetooth MAC addresses, temperature readings, camera gathered data, lighting system sensors that detect occupancy, vacancy, and ambient lighting conditions, etc. The hybrid cloud structure represented as Hybrid Cloud 101 and Hybrid Cloud 102 may use public cloud computing resources to meet temporary capacity needs that cannot be met by our private cloud. This capability enables the present invention's hybrid cloud to employ cloud bursting for scaling across at least one cloud, or a multiplicity of clouds. The primary application running in the Hybrid Cloud 101 is the present invention's Data as a Service (DaaS) engine, which includes data storage and data analytic services. Hybrid Cloud 101 also includes a Coupon Exchange for uniquely identified offers and discounts, and analytic engines, such as, but to limited to GAUSS, and GUIs for the MaaS system to request data to offer uniquely identified discounts, coupons, etc. to the MaaS system's customer's client's that have opted into the system. These uniquely identified discounts, coupons, etc. are offered to a MaaS client's customer's on-the-fly, based on analytics of past and present customer behaviors.

Hybrid Cloud 101 and Hybrid Cloud 102 may be constructed using Cisco's Intercloud product. In addition, Hybrid Cloud 101 and Hybrid Cloud 102 may be constructed using Cisco's Integration Platform, aka CIP. CIP is used to connect the present inventions diverse, on premise cloud, and DaaS applications across the business enterprise, and makes it easy to exchange data and services between them. This is done in an automated fashion, reusing application integrations and APIs to accelerate the delivery of new customer experiences, at a much lower cost.

The CIP solution brings together two powerful technologies:

1) Cisco Integration Bus, an open standards-based integration platform with over 120 prebuilt application connectors, graphical design tools, and mixed-model deployment tools, in order to integrate and deploy applications or services seamlessly and quickly.

2) API Management, a comprehensive suite of life-cycle management capabilities to design, build, and manage APIs for our systems and services.

The combination of these technologies provides the present invention a full set of enterprise-class tools and capabilities to create, deploy, manage, and capitalize on application integrations and APIs throughout our business. These include:

1) High reliability, with clustering for high availability and enterprise scalability
2) Broad business visibility through a Business Event Analyzer
3) Fast problem resolution with the Service Flow Analyzer
4) Strong security with role-based access control and Security Assertion Markup Language (SAML)
5) Accelerated deployments with the Deployment Manager and Integrated Repository
6) Advanced performance management with service-level agreement (SLA) alerts, Monitoring Framework Integration, and a Run-time Performance Manager
7) Simplified and pervasive operational control with tools like Integration Bus Remote Control, Task Scheduler, Operational Dashboard, and a Representational State Transfer (REST) API for Management Router 110 is a networking device that forwards data packets between computer networks. Routers perform the "traffic directing" functions on the Internet. A data packet is typically forwarded from one router to another through the networks that constitute the internet, until it reaches its destination node.

A router is connected to two or more data lines from different networks (as opposed to a network switch, which connects data lines from one single network). When a data packet comes in on one of the lines, the router reads the address information in the packet to determine its ultimate destination. Then, using information in its routing table or routing policy, it directs the packet to the next network on its journey. This creates an overlay inter-network. Router 110 is also a security appliance.

Network Connection 190S represents the connection from the premise where the LaaS network rack is located and Internet 100. This connection can include a variety of, but is not limited to, wired, and/or wireless, and/or fiber-optic connections, as well as an ISP modem, and head-end equipment, POTS networks, cable networks, satellite networks, microwave relays, LANS, WANS, cellular networks including a hot spot, etc.

PoE Switch 120 describes any of several standardized or ad-hoc systems which pass electrical power along with data on Ethernet cabling. This allows a single cable to provide both data connection and electrical power to devices such as wireless access points, IP cameras, and LED lights. Unlike standards such as Universal Serial Bus which also power devices over the data cables, PoE allows long cable lengths. Power may be carried on the same conductors as the data, or it may be carried on dedicated conductors in the same cable.

PoE Switch 120 also includes PoE Controller 121.

There are several common techniques for transmitting power over Ethernet cabling. Two of them have been standardized by IEEE 802.3. Since only two of the four pairs are needed for 10BASE-T or 100BASE-TX, power may be transmitted on the unused conductors of the cable. In the IEEE standards, this is referred to as Alternative B. Power may also be transmitted on the data conductors by applying a common-mode voltage to each pair. Because twisted-pair Ethernet uses differential signaling, this does not interfere with data transmission. The common mode voltage is easily extracted using the center tap of the standard Ethernet pulse transformer. This is similar to the phantom power technique commonly used for powering audio microphones. In the IEEE standards, this is referred to as Alternative A.

In addition to standardizing existing practice for spare-pair and common-mode data pair power transmission, the IEEE PoE standards provide for signaling between the power sourcing equipment (PSE) and powered device (PD). This signaling allows the presence of a conformant device to be detected by the power source, and allows the device and source to negotiate the amount of power required or available. Up to a theoretical 51 watts is available for a device, depending on the version of the standard in use and the vendor of the hardware.

A switch is a device in a computer network that electrically and logically connects together other devices. Multiple data cables are plugged into a switch to enable communication between different networked devices. Switches manage the flow of data across a network by transmitting a received message only to the one or more devices for which the message was intended. Each networked device connected to a switch can be identified using a MAC address, allowing the switch to regulate the flow of traffic. This maximizes security and efficiency of the network.

Due to these features, a switch may be seen as more "intelligent" than a network hub, which provides no security or identification of connected devices. As a result, messages have to be transmitted out of every port of the hub, greatly degrading the overall efficiency of the network.

An Ethernet switch operates at the data link layer (layer 2) of the OSI model to create a separate collision domain for each switch port. Each computer connected to a switch port can transfer data to any of the other ones at a time, and the transmissions may not interfere, with the limitation that, in half duplex mode, each line can only either receive from or transmit to its connected computer at a certain time. In full duplex mode, each line can simultaneously transmit and receive, regardless of the partner.

PoE Switch 120 transmits both data and power to the present invention's Power Station 130. The present invention's Power Station 130 is a power management and distribution switch architected to enable the next phase of the PoE-powered LED lighting evolution. The Power Station 130 is also a combiner that aggregates power from several PoE ports into several common power buses operating on Power Station 130. The Power Station 130 provides a solution to intelligently manage and distribute power provided by PoE sources, including switches and Mid-Spans, to high efficiency LED lights, while maximizing operational cost savings. The Power Station 130 is future-enabled with vertical and horizontal power regulation and distribution across multiple channels operating on multiple ports to optimize port usage for the LED industries efficiency gains, and to allow for LED lights with different power requirements to operate on the same Power Station 130. The present invention's digital intelligent Lighting System Controller is fully integrated in the Power Station 130. Optionally, the Lighting System Controller is designed to include an industrial bus controller for managing and operating relays, solenoids, PLCs, and for communicating with building automation systems, etc. In addition, the Power Station 130's back-end systems are designed to take advantage of the Cisco Integration Platform, and the Cisco Intercloud product offering. Overall, the present invention's Power Station 130 offers unparalleled cost savings for PoE-powered LED lighting networks. The Power Station 130 uses the PoE Switch 120 to power and communicate with a sensor network, other Power Station 130s, and back-end systems. The present invention's PoE switch powered solution is robust, agile, and takes advantage of the inherent features and benefits of PoE switches, such as, but not limited to, security and unified communications.

The present invention's Power Station 130 is a modular platform that may be reconfigured internally to provide a variety of port configurations, such as, but not limited to:
an 8 port power station,
a 12 port power station,
a 16 port power station,
a 20 port power station,
a 24 port power station,
a 28 port power station,
a 32 port power station,
a 36 port power station,
a 40 port power station,
a 44 port power station,
a 48 port power station,
a 60 port power station,
a 72 port power station,
a 96 port power station,
a 144 port power station,
a 192 port power station,
etc.

The Power Station 130s are designed for scalability. The modular architecture of these platforms enables the deployment of small, medium, and large PoE-powered LED lighting networks.

The key features and benefits of the present invention's Power Station 130 are illustrated in Chart 2 which includes, but is not limited to:

CHART 2

| Features | Benefits |
|---|---|
| PoE Power or Mid-Span Power | 1) The present invention's Power Stations 130 are powered by off-the-shelf PoE switches or Mid-Spans that are very reliable. Depending on the model, they can provide 150,000 to 400,000 hours MTBF. |

CHART 2-continued

| Features | Benefits |
|---|---|
| | 2) The off-the-shelf PoE switches or Mid-Spans used to power the present invention's Power Stations 130 can be configured with dual, hot-swappable power supplies.<br>3) The off-the-shelf PoE Switches used to power the present invention's Power Stations 130 may be configured to share power vertically between as many as four inter-connected, stacked switches.<br>4) The Power Station 130 is designed to negotiate individual port power requirements with off-the-shelf PoE switches. |
| Tunable Power | 1) The present invention's Power Stations 130 can be programmed to condition the PoE supplied power to the appropriate voltage and amperage requirements for any manufacturer's LED fixtures without requiring a DC power-supply, or driver. The primary benefit is flexibility for the end-user to choose LED fixtures that meet their architectural requirements without limitation.<br>2) The present invention's Power Stations 130 tunable power can be programmed to be implemented within sub-groups of channels on the same Power Station, so that LED fixtures with differing power requirements can all be supplied simultaneously. |
| Stacked PWM Channels | 1) The present invention's Power Stations 130 are powered by Stacked PWM channels operating on the same output port. Stacking PWM channels allows the Power Station 130 to take advantage of the non-linear response of LEDs to input power, in order to provide full lumen output at approximately 33% of the duty cycle of a full PWM regularly repeating cycle. The primary benefit is less energy is required to provide full lumens using Stacked PWM channels. The second benefit is more lights can operate on the same output port. The tertiary benefit is less energy means less heat, which means even longer life for LEDs. |
| Time Division Multiplexing | 1) The present invention's Power Stations 130 Stacked PWM channel feature on a single output port can be used with a Time Division Multiplexing scheme to sequence PWM duty cycle start times to be off-set, so as many as three adjacent ports can be powered using a power supply that is $\frac{1}{3}$ the size required if all three adjacent ports were operating on random, uncontrolled PWM cycle start times. Although, the same amount of power is needed to power a series of LED fixtures, the goal isn't to specify a power supply that is $\frac{1}{3}$ the size required. The goal, and primary benefit of Time Division Multiplexing, is the ability to power up to 3X additional LED fixtures per PoE Switch and Power Station combination. |
| Common Power Bus and Back-plane | 1) The present invention's Power Stations 130 are configured such that three, or perhaps four, adjacent ports operate on a Common Power Bus. The primary benefit is powered devices requiring more than 60 watts of power can be supplied. In addition, the bus provides a standard connection for four port line cards. The line cards include a micro-controller, a variable power supply, DMX for controlling power sequencing and combining power, PWM engines for On/Off-Dimming, and are designed to plug into a common backplane. |
| Rack-Mounted | 1) The present invention's Power Station 130 is 1U high, rack mountable network gear designed to be familiar to technicians, and installation crews. In addition, the rack-mountable Power Station 130 may be in close proximity to the PoE switch or Mid-Span, which means neater, more compact cabling. |
| Integrated Lighting Controller and Optional Industrial Controller | 1) The present invention's Power Station 130 include two integrated controllers, a shared memory resource and logic engine, and an API, a DMX Lighting System Controller for the lighting system, and an OPC Industrial Bus controller for controlling relays, solenoids, PLCs, and building automation systems operating on industrial buses. The Lighting System Controller is designed to plug into a common backplane.<br>2) The present invention's Power Station 130 DMX Lighting System Controller's logic engine provides for events, event related trigger thresholds, and a programmable Dimmer Matrix for PWM vs desired light levels. The event definitions for a building lighting system can be programmed via a GUI to include time- |

CHART 2-continued

| Features | Benefits |
|---|---|
| | of-day, day-of-week, holidays, opening time, closing time, personnel ID, personnel location, local building code lighting level requirements, national building code lighting level requirements, building operator lighting level requirements that exceed and supersede local and national lighting level requirements, occupancy, vacancy, ambient light level, imaging analysis, peak demands, etc. The DMX Lighting System Controller can also be programmed via GUI to respond to events and triggers for non-building lighting systems, such as those related to indoor agriculture. These events can include soil conditions, temperature, humidity, air exchanges, nutrient conditions, leaf wetness, IR imaging for plant temperature, imaging for leaf color and plant health, personnel ID, personnel location, equipment location, time-of-day, day-of-week, holidays, opening time, closing time, etc. The Lighting System Controller's lighting and industrial controllers are both designed to respond to events, and related triggers maintained in the logic engine. |
| | 3) The present invention's Power Station 130 DMX Lighting System Controller provides centralized control for one master Power Station 130 and up to four slaved Power Stations 130 in a conventional DMX universe. DMX is well known in the lighting industry, and is a robust design with 40 years of success in the marketplace. |
| | 4) The second generation present invention's Power Station 130 DMX Lighting System Controller may deliver DMX over Ethernet to remove the constraint of one master Power Station 130 and up to four slaved Power Stations 130 in a conventional DMX universe. |
| | 5) The present invention's Power Station 130 DMX Lighting System Controller includes tables for defining building, space, and room types according to national, regional, and local standards. These tables are used to configure the system, such that lights or groups of lights can be automatically adjusted using sensors to adjust lumen output levels to the correct and most efficient levels. Using building, space, and room definitions is critical in building intelligent lighting systems that self-configure, and operate accordingly. |
| | 6) The present invention's Power Station 130 DMX Lighting System Controller includes the V-Pulse ® Non-Linear Dimmer Matrix. This feature results in a dimmer that is controlled by the desired light output setting that has been mapped to the appropriate PWM duty cycle setting. The primary benefit of this feature is extreme energy savings. The secondary benefit is reduced operating temperatures, which equates to longer life for LED fixtures. The third benefit is a further reduction in air conditioning operating costs needed to subtract the heat load caused by the operation of a conventional lighting system. The fourth benefit is longer operating ranges from the Power Station 130. |
| | 7) The present invention's Power Station 130 DMX Lighting System Controller interfaces with sensors, switches, and dimmers connected thru the PoE Switch 120 to create an ad hoc control network to intelligently drive the LED lighting system using occupancy, vacancy, ambient light levels, motion, time of day, and date. In addition, sensors such as temperature, humidity, O2, CO2, can be used to intelligently drive the LED lighting system when used in environments such as indoor farming applications. |
| | 8) The present invention's Power Station 130 DMX Lighting System Controller provides a scheduler that can be programmed by a client via a web-based GUI. |
| | 9) The present invention's Power Station 130 DMX Lighting System Controller can interact wireless thru the PoE Switch with an Installation Tool app, a Maintenance Tool app, and a User Tool app. |
| | 10) The present invention's Power Station 130 DMX Lighting System Controller can also be connected to other Power Station 130 DMX Lighting System Controllers, and can be grouped together to operate in unison in the same general region of a facility, disparate regions of the same facility, multiple buildings on a |

CHART 2-continued

| Features | Benefits |
|---|---|
| | campus, an entire campus, or in a wide-area network of buildings that are widely dispersed regionally, nationally, or inter-nationally. |
| | 11) The present invention's Power Station 130 OPC Industrial Bus controller provides the ability to control relays, solenoids, and PLCs operating on industrial buses. The present invention's Power Station 130 OPC Industrial Bus controller can be connected to other Power Station 130 OPC Industrial Bus controllers and can be grouped together to operate in unison in the same general region of a facility, disparate regions of the same facility, multiple buildings on a campus, an entire campus, or in a wide-area network of buildings that are widely dispersed regionally, nationally, or inter-nationally. |
| | 12) The present invention's Power Station 130 DMX Lighting System Controller and OPC Industrial Bus controller databases are designed to be easily inter-connected using the Cisco Integration Platform. The DMX Lighting System Controller and OPC Industrial Bus controller databases are designed to record and seamlessly share small data with a big Data as a Service database and analytic engine. |
| Meraki MDM (Mobile Data Manager) (Optional) | 1) The optional Meraki MDM software application provides unified management of Power Station 130 controllers, and the entire network of controllers, from a centralized dashboard. MDM is used to intelligently and easily enforce device security policies, deploy and upgrade O/S and software, and perform remote, live troubleshooting on thousands of network connected Power Station 130 controllers. |

Power Station 130 may use input from the ambient light sensors in conjunction with the "building, space, room type" definition table and corresponding minimum light levels matrix that is stored in its memory, to select the correct light setting. The non-linear dimmer matrix that is stored in the Power Station 130's DMX Lighting System Controller memory may serve as a guide to constantly make the correct adjustments to the LED fixtures. The net result is the most efficient, and robust lighting system possible, one that is powered by PoE switches, and managed by the Power Station 130 with integrated Lighting Controller 133.

The present invention Power Station 130 provides a power management and distribution solution that is future-proofed. The efficacy of LEDs follows Moore's law, so PoE, PoE+, and UPoE power will nearly always be out of sync when optimizing available power to create logical lighting circuits. The Power Station 130 is a modular component in a PoE Switch 120-Power Station 130 combination, by conditioning standard PoE power to meet complex installation environments, and to meet the ever-changing landscape of increasing LED efficiencies.

Power Station 130 is comprised of the following: Power Bus and Back-plane 131, Controller 132, Lighting Controller 133, Shared Memory 134, optional Industrial Controller 135, Line Cards 136A, B, C, Power Conditioning Modules 137A, B, C, Micro-Controllers 138A, B, C, Input Power and Data Ports 181A, B, C, D, E, F, H, I, J and Output Power Ports 180A, B, C, D, E, F, H, I. Input power is provided by AC Mains Power 170. The Power Station 130 converts AC to DC for use by the PoE Switch, and in turn, the Power Station 130, and LED 140A, B (Mfg. A), LED 141A, B (Mfg. B), LED 142A, B (Mfg. C).

Power Bus and Back-plane 131 may be configured as a Distributed Power Architecture, or an Intermediate Bus Architecture.

Controller 132 may be a field-programmable gate array integrated circuit designed to be configured by a customer or a designer after manufacturing. The FPGA configuration is generally specified using a hardware description language (HDL), similar to that used for an application-specific integrated circuit (ASIC). Alternatively, Controller 132 may be configured as at least one micro-controller. A microcontroller, often abbreviated µC, uC or MCU, is a small computer on a single integrated circuit containing a processor core, memory, and programmable input/output peripherals. Program memory in the form of Ferroelectric RAM, NOR flash or OTP ROM is also often included on chip, as well as a typically small amount of RAM. Microcontrollers are designed for embedded applications, in contrast to the microprocessors used in personal computers or other general purpose applications. Microcontrollers make it economical to digitally control even more devices and processes. Mixed signal microcontrollers are common, integrating analog components needed to control non-digital electronic systems. Some microcontrollers may use four-bit words and operate at clock rate frequencies as low as 4 kHz, for low power consumption (single-digit milliwatts or microwatts). They will generally have the ability to retain functionality while waiting for an event such as a button press or other interrupt; power consumption while sleeping (CPU clock and most peripherals off) may be just nanowatts, making many of them well suited for long lasting battery applications. Other microcontrollers may serve performance-critical roles, where they may need to act more like a digital signal processor (DSP), with higher clock speeds and power consumption.

Typically, FPGAs contain an array of programmable logic blocks, and a hierarchy of reconfigurable interconnects that allow the blocks to be "wired together", like many logic gates that can be inter-wired in different configurations. Logic blocks can be configured to perform complex combinational functions, or merely simple logic gates like AND and OR. In most FPGAs, logic blocks also include memory elements, which may be simple flip-flops or more complete blocks of memory.

Controller 132 includes, but is not limited to, blocks designed for use as the Lighting Controller 133's Shared Memory 134, and an optional Industrial Controller 135.

In the preferred embodiment, Lighting Controller 133 is based on the DMX512A protocol. However, Lighting Controller 133 can be designed as a control system device, or set of devices, to manage, command, direct or regulate the behavior of other the LaaS system. The Lighting Controller 133 can be an open loop control system and/or a closed loop control systems. In open loop control systems output is generated based on inputs. In closed loop control systems current output is taken into consideration and corrections are made based on feedback. A closed loop system is also called a feedback control system. A hybrid control system may use both an open and closed loop control system.

DMX is a standard for digital communication networks that are commonly used to control stage lighting and effects. It was originally intended as a standardized method for controlling light dimmers, which prior to DMX512, had employed various incompatible proprietary protocols. It soon became the primary method for linking controllers such as a lighting console, to dimmers and special effects devices such as fog machines and intelligent lights. DMX has also expanded to uses in non-theatrical interior and architectural lighting, ranging from strings of Christmas lights to electronic billboards. DMX can now be used to control almost anything, reflecting its popularity in theaters and other venues.

DMX512 employs EIA-485 differential signaling at its physical layer, in conjunction with a variable-size, packet-based communication protocol. It is unidirectional.

DMX512 does not include automatic error checking and correction, and so is not an appropriate control for hazardous applications.

In 1998 the Entertainment Services and Technology Association (ESTA) began a revision process to develop the standard as an ANSI standard. The resulting revised standard, known officially as "Entertainment Technology—USITT DMX512-A-Asynchronous Serial Digital Data Transmission Standard for Controlling Lighting Equipment and Accessories", was approved by the American National Standards Institute (ANSI) in November 2004. It was revised again in 2008, and is the current standard known as "E1.11—2008, USITT DMX512-A", or just "DMX512-A".

In January 2011 ESTA merged with PLASA, a similar organization in the UK. The new organization is called Plasa. All ESTA standards are now maintained by Plasa.

A standard deployment of a DMX512 network employs a multi-drop bus topology with nodes strung together in what is commonly called a daisy chain. A network consists of a single DMX512 controller—which is the master of the network—and one or more slave devices. For example, a lighting console is frequently employed as the controller for a network of slave devices such as dimmers, fog machines and intelligent lights.

Each slave device has a DMX512 "IN" connector and usually an "OUT" (or "THRU") connector as well. The controller, which has only an OUT connector, is connected via a DMX512 cable to the IN connector of the first slave. A second cable then links the OUT or THRU connector of the first slave to the IN connector of the next slave in the chain, and so on. For example, the block diagram below shows a simple network consisting of a controller and three slaves.

The specification requires a 'terminator' to be connected to the final OUT or THRU connector of the last slave on the daisy chain, which would otherwise be unconnected. A terminator is a stand-alone male connector with an integral 120Ω resistor connected across the primary data signal pair. This resistor matches the cable's characteristic impedance. If a secondary data pair is used, a termination resistor is connected across it as well. Although simple systems (i.e., systems having few devices and short cables) may sometimes function normally without a terminator, the standard requires its use. Some DMX slave devices have built-in terminators that can be manually activated with a mechanical switch or by software, or by automatically sensing the absence of a connected cable.

A DMX512 network is called a "DMX universe". Each OUT connector on a DMX512 controller can control a single universe. Smaller controllers may have a single OUT connector, enabling them to control only one universe, whereas large control desks (operator consoles) may have the capacity to control multiple universes, with an OUT connector provided for each universe.

DMX512 data are transmitted over a differential pair using EIA-485 voltage levels. DMX512 electrical specifications are identical to those of the EIA-485-A standard, except where stated otherwise in E1.11.

DMX512 is a bus network no more than 1,200 meters (3,900 ft.) long, with not more than 32 unit loads on a single bus. If more than 32 unit loads need to communicate, the network can be expanded across parallel buses using DMX splitters. Network wiring consists of a shielded twisted pair, with a characteristic impedance of 120 Ohms, with a termination resistor at the end of the cable furthest from the controller to absorb signal reflections. DMX512 has two twisted pair data paths, although specification currently only defines the use of one of the twisted pairs. The second pair is undefined, but required by the electrical specification.

Alternatively, the present invention may employ a DMX over Ethernet protocol to extend the number of DMX universes and channels that can be controlled from a centralized Lighting Controller 133.

Due to the layered structure of the TCP/IP protocol suite that makes up the transmission standard used on Ethernet networks, multiple, unrelated pieces of data are sent down the same network. Tracking backup information such as lighting program parameters, firmware updates, RDM (Remote Device Management) information, and much more can be run down the one network, without any of the costly, time-consuming cable re-arrangement that is normally required when a lighting system's programmed configuration is changed A significant benefit of Ethernet is its "star-topology" wiring layout. While DMX uses a "daisy-chaining" method, the star-topology of Ethernet leads to a much more robust network. The lack of daisy-chaining support may seem like a disadvantage at first, but the extra resilience of a network utilizing a star-topology means a fault in a device or cable may generally have a much smaller impact over the whole network and make it easier to trace. This coupled with the lower cost of cable may make a network utilizing Ethernet a safer, more robust system than anything built using the DMX protocol. The lack of "inputs" and "outputs" in Ethernet means plug any device, be it a console or fixture, into any port without needing to worry about the direction of travel. All devices may automatically communicate with each other as required, as a result of the TCP/IP protocol suite.

One of the most under-estimated advantages of a DMX over Ethernet implementation is Ethernet's ability to leverage the wide range of technologies developed by the IT industry. Inexpensive, yet highly reliable switches and cables can be used and there's a host of sub-protocols supported by most switches. An example of this would be Spanning Tree Protocol (IEEE 802.1D) which allows redundant links between switches such that should one go down for whatever reason, the other can take over seamlessly. Another useful technology is Virtual LANs, or VLANs (IEEE 802.1Q) which allows multiple venues all on the one network to segment the network into discrete virtual networks, guaranteeing no inadvertent control of one room from another. Streaming ACN makes use of the multicasting protocol to intelligently route universes of DMX only where it's required, with no manual reconfiguration. All of these features come in commonly available switches that are extremely reliable and often available much cheaper than the largely featureless DMX splitters in use today.

There is not yet a universal agreement between manufacturers as to which DMX-over-Ethernet protocol to use. Some protocols are fairly open and used by many manufacturers, while others remain proprietary and are typically only used by the manufacturer that developed them. There are typically five main protocols: ArtNet, Pathport, ShowNet, ETC Net2 and Streaming ACN.

ArtNet is a simple protocol designed purely for encapsulating DMX data within Ethernet, nice and simply. ArtNet has introduced the lighting world to DMX-over-Ethernet and is the most widely used DMX-over-Ethernet protocol in use today. However, there are some constraints that may limit its long-term usefulness. The numbering of universes from 0 rather than 1 is not very user-friendly, and can lead to confusion and incompatibility between manufacturers. Similarly, the lack of support for multicasting can make its transmission inefficient in large events utilizing many universes. For these and other reasons, ArtNet's future is in doubt against the more robustly defined Streaming ACN protocol.

Pathport, ShowNet and ETC Net2 are protocols designed by Pathway, Strand and ETC respectively. Their penetration is not as wide-spread as ArtNet, but they are used by a few consoles and devices. The Pathport protocol is supported by both MA's GrandMA and Jands' Vista for example, while Strand's ShowNet is the only protocol available in their 300 and 500 series desk. ETC Net2 is the protocol used for ETC's previous generation of consoles.

Streaming ACN is probably the best DMX-over-Ethernet protocol available. Not only does it avoid some of the pitfalls of its predecessors, but it also adds some new features that extend the functionality allowed in DMX. This feature allows visualization software to use a different stream of DMX than that is being used by the dimmers and fixtures, embedded priority information and an "end-of-sequence" function.

One of the most important things to consider in designing a DMX-over-Ethernet protocol is the range of DMX-over-Ethernet protocols supported. While most support ArtNet, currently the most popular protocol, there is still a significant amount of equipment out there that does not support ArtNet. Streaming ACN may become the preferred protocol driving lighting equipment. Pathport nodes are unique in the large range of protocols they support. ArtNet, Pathport, ShowNet, ETC Net2 and Streaming ACN (ETC Net3) are all supported by Pathway's Pathport nodes.

The best approach for DMX and Ethernet protocol is with infrastructure that is entirely Ethernet based. This allows DMX-to-Ethernet nodes to be placed where required that convert the DMX-over-Ethernet signal to legacy DMX for only the last couple of meters to the lights. It's generally important to feed more than one run of Ethernet to a specific location so there is not only one for a DMX-to-Ethernet node, but also for native Ethernet devices, such as configuration devices and future devices to plug directly in. Some nodes allow their ports to be configured as either output or input, regardless of the gender of the physical port. This allows a node typically used for output to become an input node with no more hardware except a simple gender-changer adaptor.

Lighting Controller 133 can receive data from Switches and Sensors 162 to turn on, turn off, or dim LED 140A, B, and/or LED 141A, B, and/or LED 142A, B.

Controller 132 also includes Shared Memory 134, and optional Industrial Controller 135.

Shared Memory 134 is an electronic data storage device, implemented on a semiconductor-based integrated circuit. It is made in many different types and technologies.

Semiconductor memory has the property of random access, which means that it takes the same amount of time to access any memory location, so data can be efficiently accessed in any random order. In a semiconductor memory chip, each bit of binary data is stored in a tiny circuit called a memory cell consisting of one to several transistors. The memory cells are laid out in rectangular arrays on the surface of the chip. The 1-bit memory cells are grouped in small units called words which are accessed together as a single memory address. Memory is manufactured in word length that is usually a power of two, typically N=1, 2, 4 or 8 bits.

Data is accessed by means of a binary number called a memory address applied to the chip's address pins, which specifies which word in the chip is to be accessed. If the memory address consists of M bits, the number of addresses on the chip is 2M, each containing an N bit word. Consequently, the amount of data stored in each chip is N2M bits. The memory storage capacity for M number of address lines is given by 2M, which is usually in power of two: 2, 4, 8, 16, 32, 64, 128, 256 and 512 and measured in kibibits, mebibits, gibibits or tebibits, etc. Currently 2014 is the largest semiconductor memory chip and holds a few gibibits of data, but higher capacity memory is constantly being developed. By combining several integrated circuits, memory can be arranged into a larger word length and/or address space than what is offered by each chip, often but not necessarily a power of two.

The two basic operations performed by a memory chip are "read", in which the data contents of a memory word is read out (nondestructively), and "write" in which data is stored in a memory word, replacing any data that was previously stored there. To increase data rate, in some of the latest types of memory chips such as DDR SDRAM multiple words are accessed with each read or write operation.

In addition to standalone memory chips, blocks of semiconductor memory are integral parts of many computer and data processing integrated circuits. For example the microprocessor chips that run computers contain cache memory to store instructions awaiting execution.

Shared Memory 134 is used by both the Lighting Controller 133, and the optional Industrial Controller 135. Shared Memory 134 is used to store data necessary for the semi-automatic, or automatic, control of the LaaS and MaaS system. This data can include, but is not limited to, patient identity, medical worker identity, office employee identity, maintenance personnel identity, student identity, teacher identity, security personnel identity, building type, space type, room type, LED fixture voltage, LED fixture amperage, LED lumens, LED fixture type, LED fixture height above floor, LED fixture height above work surface, ambient light condition measurements and triggers motion measurements, occupancy measurements, vacancy measurements, humidity measurements, temperature measurements, air quality measurements, soil condition measurements, leaf wetness measurements, time-of-day, day-of-week, holiday schedules, building operational schedules, peak demand requirements, HVAC thermostat measurements, refrigerator measurements, baking oven measurements, point-of-sale system measurements, WiFi measurements, Bluetooth measurements, mobile device app measurements, facial expression measurements, location measurements, license plate reader readings, RFID tag readings, temporary over-ride measurements, lighting system wall switch signal measurements, non-linear dimmer matrices, etc.

Lighting Controller 133 and optional Industrial Controller 135 can also use data stored on Internet 100 and/or Hybrid Cloud 101 and/or Hybrid Cloud 102 to semi-automatically and automatically control LED 140A, B, LED 141A, B, and LED 142A, B, and Relays, PLCS, Solenoids 161. This data includes, but is not limited to, patient identity, medical worker identity, office employee identity, maintenance personnel identity, student identity, teacher identity, security personnel identity, building type, space type, room type, LED fixture voltage, LED fixture amperage, LED lumens, LED fixture type, LED fixture height above floor, LED fixture height above work surface, ambient light condition measurements and triggers, motion measurements and triggers, occupancy measurements and triggers, vacancy measurements and triggers, humidity measurements and triggers, temperature measurements and triggers, air quality measurements and triggers, soil condition measurements and triggers, leaf wetness measurements and triggers, time-of-day triggers, day-of-week triggers, holiday schedules, building operational schedules, peak demand requirements and triggers, HVAC thermostat measurements and triggers, refrigerator measurements and triggers, baking oven measurements and triggers, point-of-sale system measurements and triggers, WiFi measurements and triggers, Bluetooth measurements and triggers, mobile device app measurements and triggers, facial expression measurements and triggers, location measurements and triggers, license plate reader readings and triggers, RFID tag readings, measurements and triggers, temporary over-ride measurements and triggers, lighting system wall switch signal measurements and triggers, non-linear dimmer matrices, etc.

Controller 132 also includes an optional Industrial Controller 135. Optional Industrial Controller 135 is designed to control Relays, PLCs, and Solenoids 161.

Line Card 136A, B, C is a printed circuit board that provides transmitting/receiving ports for data, and power transmission over the Intelligent Lighting Network of the present invention. The Line Cards 136A, B, C plug into a modular chassis (not shown) of the Power Station 130.

Line Card 136A, B, C also includes Power Conditioning Modules 137A, B, C respectively. The Power Conditioning Modules 137A, B, C convert the standard electrical output of PoE, PoE+, or PoE++, or non-standard PoE versions to the proper voltage and amperage required to power LED 140A, B, or LED 141A, B, or LED 142A, B. One advantage of the present invention's Power Station 130 is it is LED fixture agnostic, and LED fixtures from different manufacturers can be powered on the same Intelligent Lighting Network by the same Power Station 130.

Line Card 136A, B, C also includes Micro-Controller 138A, B, and C. Micro-Controller 138A, B, C is configured to respond to DMX512 commands for stacking two channels on top of each other, delivered on a single Output Power Port 180A, B, C, D, E, F, H, I to power at least one LED 140A, B, or LED 141A, B, or LED 142A, B. In addition, Micro-Controller 138A, B, C is configured to respond to DMX512 commands to connect a multiplicity of DMX channels to a multiplicity of Output Power Ports 180A, B, C, D, E, F, H, I.

Line Card 136A, B, C may be configured in a variety of form factors, including, but not limited to, a small box for managing and distributing power that is located near LED 140A, B, LED 141A, B, and LED 142A, B, or in the form of an electrical wall outlet that is located near a free-standing, or mobile, lamp fixture that is designed to accept incandescent or CFL bulbs, etc.

In the present invention, the incandescent or CFL bulbs would be replaced with LED screw-based bulbs.

Using Line Card 136A, B, C configured as both a small box for managing and distributing power that is located near LED 140A, B, LED 141A, B, and LED 142A, B, and in the form of an electrical wall outlet that is located near a free-standing, or mobile, lamp fixture that is designed to accept incandescent or CFL bulbs, etc., a hybrid PoE-powered system that allows for a wide variety of aesthetically pleasing free-standing, or mobile, lamp fixtures to be used in conjunction with edge-light LED Flat Panels, reflective LED troffers, LED recessed lights, etc.

Line Card 136A, B, C (not shown) can include wireless capabilities, such as, but not limited to, WiFi, Zigbee, Z-Wave, etc. to enable communications with wireless capabilities (not shown) in Controller 132. The wireless communications can be used to turn lights on, off, or dim. In addition, the Line Card 136A, B, C configured as at least one electrical wall outlet that is located near a free-standing, or mobile, lamp fixture that is includes screw-based LED lights can be grouped logically together by Controller 132, and controlled as group, or according to triggers from Switches and Sensors 162.

LED 140A, B, LED 141A, B, and LED 142A, B are fixtures that produce light via a light-emitting diode (LED). LED lamps have a lifespan and electrical efficiency that is several times better than incandescent lamps, and significantly better than most fluorescent lamps, with some chips able to emit more than 100 lumens per watt.

Like incandescent lamps and unlike most fluorescent lamps (e.g. tubes and compact fluorescent lamps or CFLs), LEDs come to full brightness without need for a warm-up time. The life of fluorescent lighting is also reduced by frequent switching on and off.

Some LED lamps are made to be a direct compatible drop-in replacement for incandescent or fluorescent lamps. The LED lamp packaging may show the lumen output, power consumption in watts, color temperature in kelvins or description (e.g. "warm white"), operating temperature range, and sometimes the equivalent wattage of an incandescent lamp of similar luminous output.

Most LEDs do not emit light in all directions, and their directional characteristics affect the design of lamps, although omnidirectional lamps which radiate light over a 360° angle are becoming more common. The light output of single LEDs is less than that of incandescent and compact fluorescent lamps. In most applications multiple LEDs are used to form a lamp, although high-power versions (see below) are becoming available.

LED chips need controlled direct current (DC) electrical power. An appropriate circuit is required to convert alternating current from the supply to the regulated low voltage direct current used by the LEDs. LEDs are adversely affected by high temperature, so LED lamps typically include heat dissipation elements such as heat sinks and cooling fins.

AutoID 150A, B, C, D, E, F (aka Automatic Identification and Data Capture (AIDC)) refers to the methods of automatically identifying objects, collecting data about them, and entering that data directly into computer systems, without human involvement. Technologies typically considered as part of AIDC include bar codes, Radio Frequency Identification (RFID), biometrics, magnetic stripes, Optical Character Recognition (OCR), smart cards, and voice recognition. AIDC is also commonly referred to as "Automatic Identification," "Auto-ID," and "Automatic Data Capture."

AIDC is the process or means of obtaining external data, particularly through analysis of images, sounds or videos. To capture data, a transducer is employed which converts the actual image or a sound into a digital file. The file is then stored and at a later time it can be analyzed by a computer, or compared with other files in a database to verify identity or to provide authorization to enter a secured system. Capturing of data can be done in various ways and the best method depends on application.

AIDC also refers to the methods of recognizing objects, getting information about them and entering that data or feeding it directly into computer systems without any human involvement. Automatic identification and data capture technologies include barcodes, RFID, barcodes, OCR, magnetic stripes, smart cards and biometrics (like iris and facial recognition system).

Radio frequency identification (RFID) is relatively a new AIDC technology which was first developed in 1980s. The technology acts as a base in automated data collection, identification and analysis systems worldwide.

RFID and barcodes are the primary AutoID (aka AIDC) technologies that would be used to mark LED 140A, B, LED 141A, B, and LED 142A, B.

In the present invention, AutoID 150A, B, C, D, E, F configured as RFID tags would be used during installation to capture the ID of the light and its physical location by RFID triangulation. These identities and locations would be compared to the RCP (Reflected Ceiling Plan) for the installation. In this manner, the Intelligent Lighting Network System may become self-aware, and capable of becoming self-configuring. The DMX channels for a light, or string of lights, can be assigned on-the-fly. In addition, during installation, Lighting Controller 133 can access tables in Shared Memory 134 that define national and local code lighting levels for various building types, and spaces, and room types. Using the lighting systems sensors in Switches and Sensors 162 the Intelligent Lighting Network System can be configured and adjusted automatically.

Access Point 160 is a WiFi access point that is used to communicate wireless with the Intelligent Lighting Network System, and to monitor WiFi Radio MAC addresses. In addition, Access Point 160 includes a Bluetooth Radio that can monitor Bluetooth Radio MAC addresses. One example of such an Access Point 160 is the Meraki MR series, which tracks probing MAC addresses from associated and non-associated clients. This data is exported in real time from the access points to Meraki's cloud for analytics. Information is then calculated and presented in the Meraki dashboard to display metrics such as user dwell-time, repeat visits and capture rate (people passing by vs. coming inside a site). This information can be used by retailers, hospitality, and enterprise customers to understand foot traffic and visitor behavior across sites, and can facilitate an optimization of opening hours, marketing initiatives, and staffing policies.

Digital Signage and Marketing System 163 is comprised of digital signs (not shown), digital advertising and messaging players (not shown), client GUIs (not shown), customer GUIs (not shown), cameras (not shown), optional kiosks (not shown), social media marketing engine (not shown), and apps for receiving coupons, discounts, and offers generated by the Digital Signage and Marketing System 163.

Cables 190A, B, C, D, E, F, H, I, J, K, L M, N, O, P, Q are used in electrical and electronic systems for transmitting electric power or telecommunication signals from one place to another. Cables 190A, B, C, D, E, F, H, I, J, K, L M, N, O, P, Q are made-up of one or more conductors. Electric communication cables transmit voice messages, computer data, and visual images via electrical signals to telephones, wired radios, computers, teleprinters, facsimile machines, and televisions. There is no clear distinction between an electric wire and an electric cable. Usually the former refers to a single, solid metallic conductor, with or without insulation, while the latter refers to a stranded conductor or to an assembly of insulated conductors.

Wireless Connection 190R illustrates a wireless connection from the AutoID 150A, B, C, D, E, and F to a wireless access point, which can be configured, such as, but not limited to, an RFID interrogator.

Figure 2:
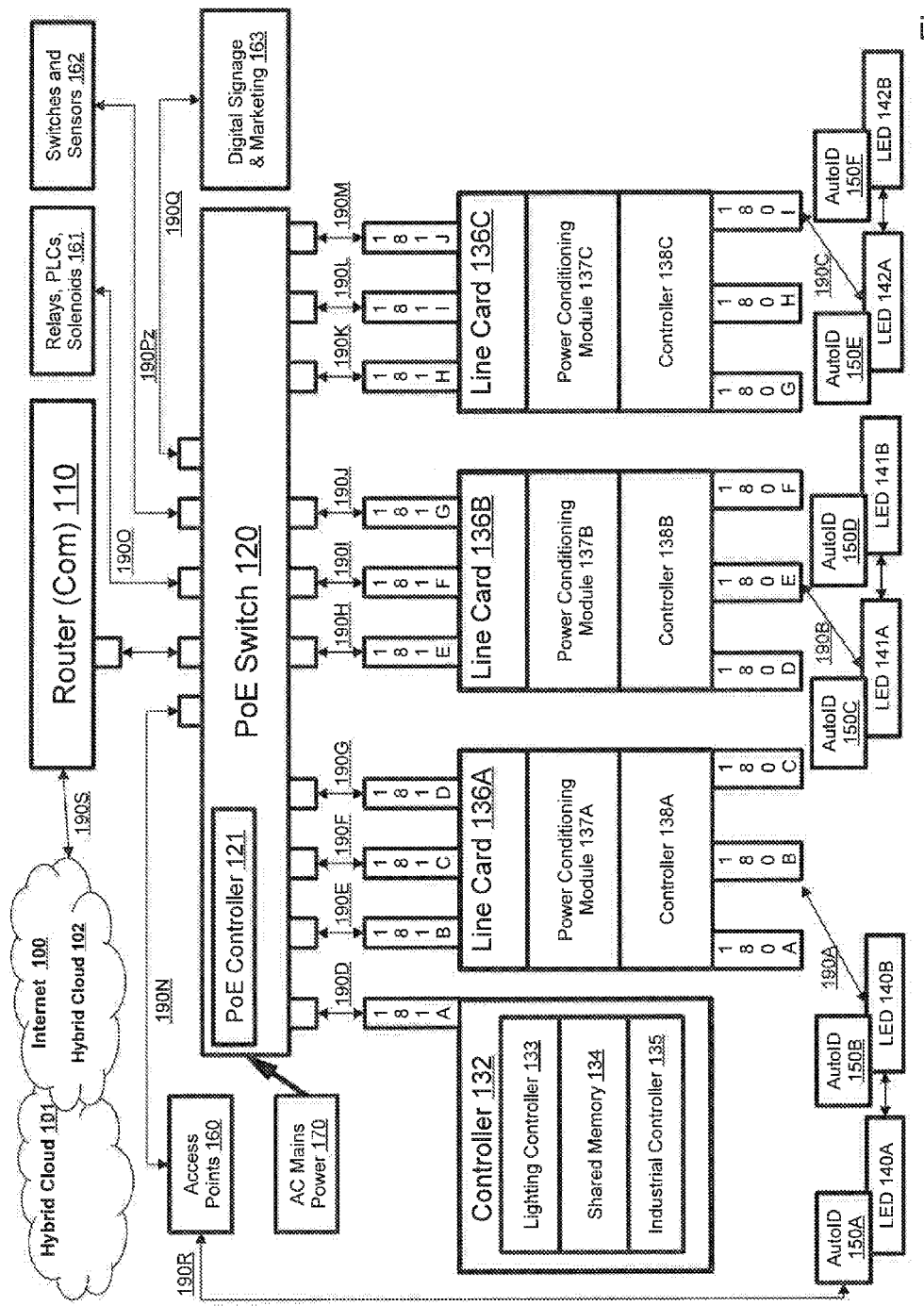
FIG. 2 is an illustration of an alternate embodiment of the present invention shown in context of its larger eco-system.

FIG. 2 is an illustration of an alternative embodiment of the present invention in which the Power Station 130 as illustrated in FIG. 1 is broken into separate components, which include Controller 132, Lighting Controller 133, Shared Memory 134, and optional Industrial Controller 135 which are integrated in a rack-mountable chassis, and Line Cards 136A, B, C which are packaged as separate devices. The like-identified elements in FIG. 1 and FIG. 2 have previously been described in FIG. 1.

It is important to note that Line Card 136A, B, C illustrated in FIG. 2 may be configured in a variety of form factors, including, but not limited to, a small box for managing and distributing power that is located near LED 140A, B, LED 141A, B, and LED 142A, B, or in the form of an electrical wall outlet that is located near a free-standing, or mobile, lamp fixture that is designed to accept incandescent or CFL bulbs, etc.

In the present invention, the incandescent or CFL bulbs would be replaced with LED screw-based bulbs.

Using Line Card 136A, B, C configured as both a small box for managing and distributing power that is located near LED 140A, B, LED 141A, B, and LED 142A, B, and in the form of an electrical wall outlet that is located near a free-standing, or mobile, lamp fixture that is designed to accept incandescent or CFL bulbs, etc., a hybrid PoE-powered system that allows for a wide variety of aesthetically pleasing free-standing, or mobile, lamp fixtures to be used in conjunction with edge-light LED Flat Panels, reflective LED troffers, LED recessed lights, etc.

Line Card 136A, B, C (not shown) can include wireless capabilities, such as, but not limited to, WiFi, Zigbee, Z-Wave, etc. to enable communications with wireless capabilities (not shown) in Controller 132. The wireless communications can be used to turn lights on, off, or dim. In addition, the Line Card 136A, B, C configured as at least one electrical wall outlet that is located near a free-standing, or mobile, lamp fixture that is includes screw-based LED lights can be grouped logically together by Controller 132, and controlled as group, or according to triggers from Switches and Sensors 162.

The following description is a practical example of how the present invention for powering and communicating with an intelligent lighting system operates in a small footprint building, such as a Quick Service Restaurant (QSR) setting.

An employee enters the building and turns a wall switch (Switches and Sensors 162) located near the door, as required by building codes, from the 'OFF' position to the 'ON' position.

A signal in the form of a data is sent via cable 190Q to PoE Switch 120 which includes a code for "ON" and the electronic identity of the wall switch. A Cable 190Q is the preferred physical medium for transmitting the 'ON' data signal, but it should be noted that a wireless channel, such as WiFi, Bluetooth, Zigbee, etc., are also acceptable means for communication.

The data signal is routed to the circuit boards for Controller 132 and Lighting Controller 133 via cable 190D and Input Power and Data Port 181A.

The program operating the intelligent lighting system on Lighting Controller 133 receives the data signal wall switch to turn "ON" the lights. The lighting system program accesses various data tables in Shared Memory 134 to cross-reference the electronic identity of the wall switch against which LEDs 140A, B, 141A, B, 142A, B are grouped together logically as a lighting circuit. The lighting system program also accesses data tables in Shared Memory for actions to take for the appropriate dim level according to some, or all, of the following tables with associated triggers and instructions: time-of-day, day-of-week, holiday schedule, ambient light conditions as detected by ambient light sensors (Switches and Sensors 162), motion as detected by motion sensors (Switches and Sensors 162), occupancy and vacancy as calculated by motion data, the maximum dim setting selected from a group consisting of: minimum light settings according to national and local buildings codes, minimum light settings according to OSHA, minimum light settings according to various standards organizations, minimum light settings according to insurance company requirements, and minimum light settings according to building owner requirements, AutoID 150A, B, C, D, E, F data signals consisting of serial numbers related to various LED 140A, B (Mfg. A), LED 141A, B (Mfg. B), LED 142A, B (Mfg. C) received via Wireless Connection 190R of which the data consists of dimmer matrices for each SKU that include Pulse Width Modulation Duty Cycles matched to the desired light outputs, and logical circuits which include SKU vs. Output Power Ports 180A, B, C, D, E, F, H, I vs. LED 140A, B (Mfg. A), LED 141A, B (Mfg. B), LED 142A, B (Mfg. C).

Lighting Controller 133 uses all available data to intelligently select the correct Pulse Width Modulation duty cycle setting that is required for each LED 140A, B (Mfg. A), LED 141A, B (Mfg. B), LED 142A, B (Mfg. C), and which physical channels to distribute power over to the various lights LED 140A, B (Mfg. A), LED 141A, B (Mfg. B), LED 142A, B (Mfg. C) in the lighting network.

The Power Bus and Back-plane 131 supplies power and routes data to Line Cards 136A, B, C.

Lighting Controller 133 communicates with the Power Conditioning Modules 137A, B, C, on Line Cards 136A, B, C the correct DC volt and amperage settings according the SKU of each LED 140A, B (Mfg. A), LED 141A, B (Mfg. B), LED 142A, B (Mfg. C). In addition, Lighting Controller 133 communicates with Microcontrollers 138A, B, C on Line Cards 136A, B, C, the correct PWM duty cycle settings for each physical channel that is connected to Output Power Ports 180A, B, C, D, E, F, H, I that are connected to LED 140A, B (Mfg. A), LED 141A, B (Mfg. B), LED 142A, B (Mfg. C).

The intelligent lighting back-end system can store relevant lighting system data tables in Hybrid Cloud 101 and/or Hybrid Cloud 102 located on Internet 100 via Router 100. The intelligent lighting system also includes at least one Access Point 160 so mobile users can control the system via apps on mobile phones and tablets.

The present invention's network gear can also be used to power Digital Signage and Marketing systems 163.

Lastly, the present invention's Optional Industrial Controller 135 is programmed to use Shared Memory 134 to access parameters, data, electronic identities, and triggers to control Relays, PLC's, and Solenoids 161 that may be connected to walk-in coolers, oven belt speeds and temperatures, HVAC thermostats, etc.

The present invention has been described in particular detail with respect to several possible embodiments. Those of skill in the art may appreciate that the invention may be practiced in other embodiments. First, the particular naming of the components and capitalization of terms is not mandatory or significant, and the mechanisms that implement the invention or its features may have different names, formats, or protocols. Also, the particular division of functionality between the various systems components described herein is merely exemplary, and not mandatory. Functions performed by a single system component may instead be performed by multiple components, and functions performed by multiple components may instead performed by a single component.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage devices. Certain aspects of the present invention include process steps and instructions. It should be noted that the process steps and instructions of the present invention could be embodied in software, firmware or hardware, and when embodied in software, could be downloaded to reside on and be operated from different platforms.

Furthermore, the computers referred to in the specification may include a single processor or may be architectures employing multiple processor designs for increased computing capability. The scope of this invention should be determined by the appended claims and their legal equivalents, rather than by the examples given.

What is claimed is:

1. A system for powering and controlling a light-emitting diode (LED) lighting network, the system comprising:
   at least one router operably connected to Internet and a local network;
   at least one line card including:
      (a) at least one physical channel connected to an output port;
      (b) a power conditioning module operably powering the at least one physical channel; and
      (c) a controller, said controller configured to control an amount of conditioned power using one or more pulse width modulators, and control start and stop times of the one or more pulse width modulators;

at least one power distribution unit having a lighting system controller and the at least one line card;

at least one Power-over-Ethernet switch configured to:
(a) control the flow of a lighting system switch and sensor data within the LED lighting network; and
(b) supply direct current power to the at least one power distribution unit;

a structured cabling network that is connected to the output port of the at least one line card; and an LED fixture that is connected to a homerun cable that is connected to the output port of the at least one line card.

2. The system of claim 1, wherein the at least one line card is configured in one or more form factors.

3. The system of claim 2, wherein the one or more form factors allows the system to be utilized with a standard LED fixture.

4. The system of claim 2, wherein the one or more form factors allows the system to be utilized with a screw-based lighting fixture.

5. The system of claim 1, wherein the at least one Power-over-Ethernet switch is configured to power a sensor network that collects data by utilizing the at least one router that is operably connected to Internet and the local network.

6. The system of claim 5, wherein the sensor network includes at least one sensor, said at least one sensor is an ambient light sensor.

7. The system of claim 6, wherein the at least one power distribution unit further comprises a shared memory device.

8. The system of claim 7, wherein the ambient light sensor is configured to store data on the shared memory device.

9. The system of claim 8, wherein the at least one power distribution utilizes a data from the ambient light sensor that is stored on the shared memory device to select the light setting.

10. The system of claim 1, wherein the at least one power distribution unit is equipped with vertical and horizontal power regulation and distribution across multiple channels operating on multiple ports to optimize port usage.

11. The system of claim 1, wherein the controller is designed to include an industrial bus controller for managing and operating relays, solenoids, PLCs, and configured to communicate with building automation systems.

12. The system of claim 1, wherein the at least one power distribution unit is configured to convert AC to DC for use by the at least one Power-over-Ethernet switch.

13. A system for powering and controlling a light-emitting diode (LED) lighting network, the system comprising:
at least one router operably connected to Internet and a local network;
at least one line card including:
(a) at least one physical channel connected to an output port;
(b) a power conditioning module operably powering the at least one physical channel; and
(c) a controller, said controller configured to control an amount of conditioned power using one or more pulse width modulators, and control start and stop times of the one or more pulse width modulators;
at least one power distribution unit having a lighting system controller and the at least one line card;
at least one Power-over-Ethernet switch configured to:
(a) control the flow of a lighting system switch and sensor data within the LED lighting network; and
(b) supply direct current power to the at least one power distribution unit; and
at least one LED fixture in a daisy chain that is connected via a jumper cable to an LED fixture that is connected via a homerun cable to the output port of the at least one line card.

14. The system of claim 13, wherein the at least one line card is configured in one or more form factors.

15. The system of claim 14, wherein the one or more form factors allows the system to be utilized with a standard LED fixture.

16. The system of claim 14, wherein the one or more form factors allows the system to be utilized with a screw-based lighting fixture.

17. The system of claim 13, wherein the at least one line card includes a wireless device configured to enable wireless communication with the controller.

18. The system of claim 17, wherein the at least one line card utilizes wireless communication with the controller to turn lights on, off, or dim.

* * * * *